United States Patent [19]

Debello

[11] Patent Number: 4,574,648
[45] Date of Patent: Mar. 11, 1986

[54] PINION GEAR RETAINER ASSEMBLY FOR A STARTER MOTOR OF AN INTERNAL COMBUSTION ENGINE

[76] Inventor: Robert J. Debello, 304 Saddle River Rd., Saddle Brook, N.J. 07662

[21] Appl. No.: 570,705

[22] Filed: Jan. 13, 1984

[51] Int. Cl.[4] .............................................. F02N 15/06
[52] U.S. Cl. ........................................... 74/7 A; 74/7 R
[58] Field of Search ........................ 74/7 R, 7 E, 7 A; 403/326, DIG. 7, 344

[56] References Cited

U.S. PATENT DOCUMENTS

| | | | |
|---|---|---|---|
| 1,442,223 | 1/1923 | Knebusch | 403/326 |
| 1,464,386 | 8/1923 | Ingram | 403/326 |
| 2,317,889 | 4/1943 | Danneman | 403/326 |
| 2,322,949 | 6/1943 | Lux | 403/DIG. 8 |
| 2,760,258 | 8/1956 | Rieger | 403/326 |
| 3,460,655 | 8/1969 | Bowcott | 192/45 |
| 4,206,656 | 6/1980 | Hollyoak | 74/7 A |
| 4,346,615 | 8/1982 | Yoneda et al. | 74/7 A |
| 4,412,457 | 11/1983 | Colvin | 74/7 A |
| 4,495,825 | 1/1985 | Ruhle | 74/7 A |

OTHER PUBLICATIONS

Chilton's Auto Repair Manual 1975, pp. U123 to U133.

*Primary Examiner*—Ronald H. Lazarus
*Attorney, Agent, or Firm*—David A. Jackson; Daniel H. Bobis

[57] ABSTRACT

In a starter motor for an internal combustion engine, the starter motor being of the type including a cranking motor, a clutch assembly rotatably connectable with the cranking motor and including a pinion gear slidably mounted on a pinion shaft for engagement with a ring gear of the internal combustion engine, and a solenoid assembly and shift lever for slidably moving the pinion gear into engagement with the ring gear and for rotatably connecting the pinion gear with the cranking motor, the starter motor includes a circumferential groove formed in the distal end of the shaft; a split ring positioned in the groove and including first and second part-annular rings which form, in combination, a circular configuration in the groove extending for an angular extent of approximately 360°; and a retaining ring positioned on the shaft in abutting and surrounding relation to the split ring for maintaining the split ring in the groove.

6 Claims, 6 Drawing Figures

PINION GEAR RETAINER ASSEMBLY FOR A STARTER MOTOR OF AN INTERNAL COMBUSTION ENGINE

BACKGROUND OF THE INVENTION

1. Field of the Invention

This invention relates generally to starter motors for internal combustion engines and, more particularly, is directed to a retainer assembly for a pinion gear of a starter motor for an internal combustion engine.

2. Description of the Prior Art

Conventional starter motors for internal combustion engines utilize a clutch which is slidably positioned on a shaft. In particular, during starting of the internal combustion engine, a solenoid assembly slidably moves the clutch into engagement with a pinion gear on the same shaft. The clutch and pinion gear then continue to move along the shaft until the pinion gear engages a ring gear of the engine for starting the latter. In order to precisely position the pinion gear with respect to the ring gear and thereby limit the extent of travel of the pinion gear on the shaft, a circumferential groove is formed on the shaft distally of the pinion gear and a snap ring is force-fit over the shaft and seats within the groove. A retaining ring is positioned in surrounding relation to the snap ring. With such arrangement, sliding movement of the pinion gear along the shaft is limited by the retainer assembly.

However, with conventional starter motors, it is necessary that the snap ring occupies only a limited angular extent so that it can be force-fit over the end of the shaft into the groove. In this regard, the snap ring is cut away so as to occupy generally a maximum angle of approximately 300°. In some cases, such as with the starter motor used by the Ford Motor Company, the snap ring is semi-circular so as to occupy an angle of only approximately 180°. However, because of the limited angular extent of the snap ring, there is a reduced area to resist the force of the pinion gear impacting upon the retainer assembly when the pinion gear is moved into engagement with the ring gear, than would otherwise occur with a snap ring extending the entire circumference of the groove. Accordingly, the snap rings used in conventional starter motors may not be capable of withstanding the impact forces from the pinion gear over a prolonged period of time, thereby cracking or breaking.

OBJECTS AND SUMMARY OF THE INVENTION

Accordingly, it is an object of this invention to provide a novel pinion gear retainer assembly for a starter motor of an internal combustion engine.

More particularly, it is an object of the present invention to provide a novel pinion gear retainer assembly for a starter motor of an internal combustion engine in which a split ring of the retainer assembly extends within the groove for approximately 360°.

In accordance with an aspect of the present invention, in a starter motor for an internal combustion engine, the starter motor being of the type including a shaft having a distal end, a pinion gear slidably mounted on the shaft at the distal end thereof and a clutch assembly slidably mounted on the shaft and engageable with the pinion gear, the starter motor comprising a circumferential groove formed in the distal end of the shaft; split ring means positioned in the groove and including first and second part-annular ring means, each positioned in the groove and each having opposite ends in one of abutting and near abutting relation with respective opposite ends of the other part-annular ring means; and retaining means positioned on the shaft in surrounding relation to the split ring means for maintaining the split ring means in the groove.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
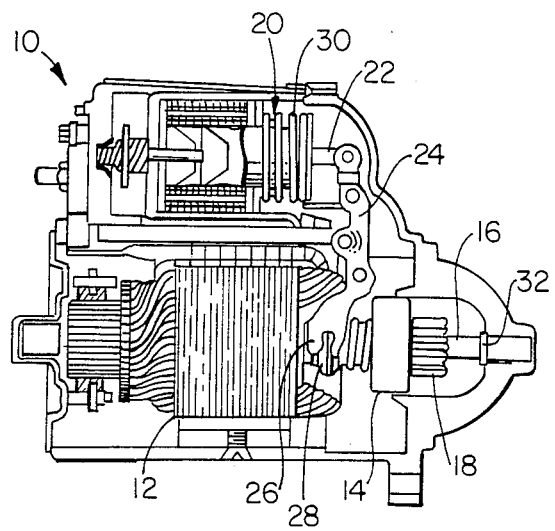
FIG. 1 is a schematic, cut-away view of a starter motor with which the present invention can be used.

Referring to the drawings in detail, and initially to FIG. 1 thereof, a starter motor 10 with which the present invention can be used includes a cranking motor 12 and a free-running clutch 14 slidable on a pinion shaft 16 and rotatably engageable by cranking motor 12. Free-running clutch 14 includes a pinion gear 18 secured thereto which is slidably movable along pinion shaft 16 with free-running clutch 14.

In particular, starter motor 10 includes a solenoid assembly 20 having a reciprocable plunger 22, the free end of which is pivotally connected to a shift lever 24. The opposite free end 26 of shift lever 24 engages a clutch actuator 28 of free-running clutch 14.

In operation, for starting the internal combustion engine, solenoid assembly 20 is actuated to move plunger 22 in the rearward or leftward direction of FIG. 1 against a return spring 30 of solenoid assembly 20. As a result, shift lever 24 biases free-running clutch 14 and pinion gear 18 to the right, as viewed in FIG. 1, along pinion shaft 16 until pinion gear 18 abuts against a retainer assembly 32 positioned distally on pinion shaft 16 with respect to pinion gear 18. At such position, pinion gear 18 engages a ring gear (not shown) of the internal combustion engine. At the same time, free-running clutch 14 rotatably connects cranking motor 12 to pinion gear 18, whereby pinion gear 18 is caused to rotate while in meshing engagement with the ring gear of the internal combustion engine for starting the latter. The above operation of a starter motor for an internal combustion engine is well known in the art and a further and more detailed description thereof will be omitted herein for the sake of brevity.

With conventional starter motors, the retainer assembly which limits the sliding movement of pinion gear 18 along pinion shaft 16 is formed by a snap ring which is force-fit over the end of pinion shaft 16 and seats within a circumferential groove therein. A retaining ring is positioned in surrounding relation to the snap ring seated within the groove.

However, with such retainer assembly, since the snap ring which seats within the groove is force-fit over the end of pinion shaft 16, the snap ring must be capable of sufficient deformation to be force-fit over pinion shaft 16. In this regard, snap rings used with conventional starter motors are generally in the form of a C-shape or semi-circular shape in order to provide sufficient deformation for the force-fit. In other words, by providing such configuration, the ends of the snap ring can be spread apart over pinion shaft 16 to fit over the latter.

It is to be appreciated, however, that the snap ring must withstand sufficient impact over a period of time from pinion gear 18 during the starting operation. Since conventional snap rings occupy an angular extent less than approximately 300°, there may not be sufficient area of the snap ring within the groove to withstand such impact forces over an extended period of time. As a result, the snap ring may crack or break.

Figure 4:
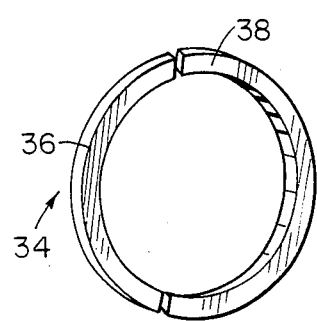
FIG. 4 is a perspective view of a split ring that forms part of the retainer assembly of FIG. 2.
Figure 2:
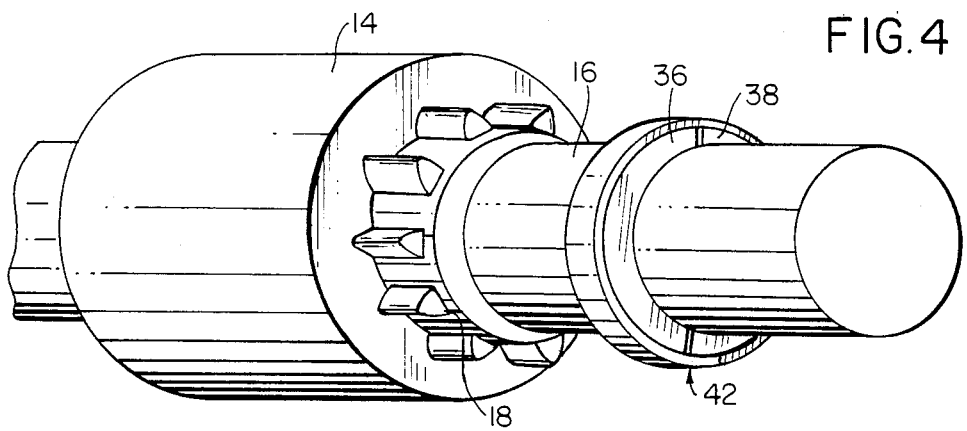
FIG. 2 is an enlarged perspective view of a retainer assembly according to one embodiment of the present invention, illustrated in connection with an associated pinion gear and clutch of a starter motor.

In accordance with an aspect of the present invention, starter motor 10 utilizes a split ring 34 formed of two part-annular sections 36 and 38, as shown in FIG. 4. Part-annular sections 36 and 38, when combined, as shown in FIG. 4, effectively form a complete circular ring which occupies an angular extent of approximately 360°.

Figure 5:
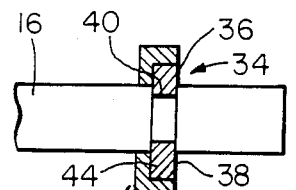
FIG. 5 is a partial cross-sectional view of the retainer assembly of FIG. 2, illustrated in relation to the groove in the pinion shaft of a starter motor.

It is to be appreciated that split ring 34 need not be force-fit over the end of pinion shaft 16 because it is constructed as two separate part-annular sections. Further, because the angular extent of the combined part-annular sections 36 and 38 is approximately 360°, split ring 34, when positioned within the circumferential groove 40 (FIG. 5), provides a maximum resistance against the impact force from pinion gear 18. Since split ring 34 occupies an angular extent of approximately 360°, any impact force from split ring 18 is distributed over a greater angular extent such that there is less force per unit area on split ring 34 so as to inhibit cracking, breaking or the like.

Figure 3:
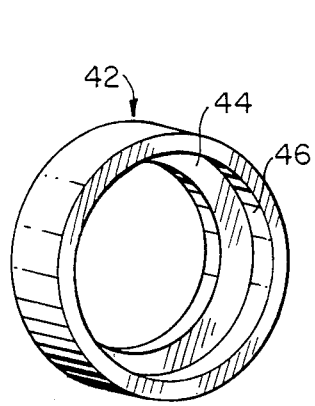
FIG. 3 is a perspective view of a retaining ring that forms part of the retainer assembly of FIG. 2.
Figure 6:
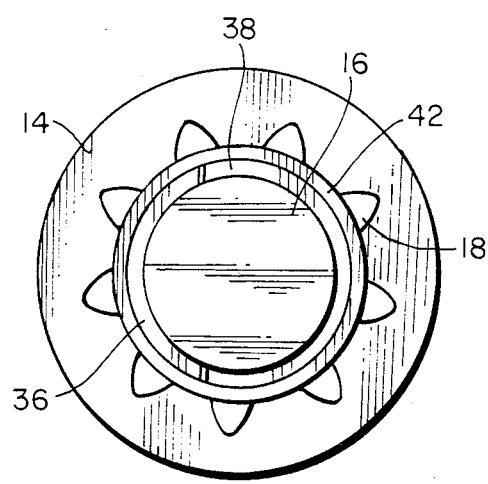
FIG. 6 is an end plan view of the retainer assembly of FIG. 2 according to the present invention, in relation to the pinion gear and clutch of the starter motor.

As with conventional starter motors, starter motor 10 according to the present invention further includes a retaining ring 42 (FIG. 3) having a rearward limiting surface 44 which is slidably positioned on pinion shaft 16 in abutting relation to split ring 34 when the latter is positioned within groove 40, and has a forward overhanging section 46 of a larger diameter which sits on and surrounds split ring 34, preferably in a force-fit relation, to maintain split ring 34 within groove 40.

Accordingly, with the retainer assembly 32 according to the present invention, there is a maximum resistance to the impact force of pinion gear 18. In addition, because of the greater angular extent of split ring 34 according to the present invention, there is greater frictional resistance to rotation than with split rings of conventional starter motors, and accordingly, less rotation thereof.

It is to be appreciated that, in practical application, split ring 34 occupies an angular extent slightly less than 360°. Of course, the greater the angular extent of split ring 34, the greater the rotational and impact resistance there will be. However, split ring 34 according to the present invention can operate satisfactorily with as much as a 5% annular gap, that is, an annular gap of between 0° and 18°. In this regard, the ends of each part-annular section 36 or 38 are in abutting or at least near abutting relation to the respective ends of the other part-annular section 38 or 36.

Further, it is be appreciated that, although part-annular section 36 has been shown in FIG. 4 to occupy a smaller angular extent than part-annular section 38, the two part-annular sections 36 and 38 may each occupy an approximately 180° angular extent.

Having described a specific preferred embodiment of the invention with reference to the accompanying drawings, it is to be understood that the present invention is not limited to that precise embodiment, and that various changes and modifications may be effected therein by one of ordinary skill in the art within the spirit and scope of the present invention as defined by the appended claims.

What is claimed is:

1. In a starter motor for an internal combustion engine, the starter motor being of the type including a shaft having a distal end, a pinion gear slidably mounted on said shaft and a clutch assembly engageable with said pinion gear and slidably mounted on said shaft, said starter motor comprising:

a circumferential groove formed in said distal end of said shaft;

split ring means positioned in said groove for resisting an impact force from said pinion gear as the latter slides on said shaft, and including first and second part-annular ring means positioned in said groove to form a circular configuration having a combined angular extent of approximately 360°; and retaining ring means positioned on said shaft in a snug fitting, abutting and surrounding relation to said split ring means for holding said split ring means in said groove without compressing said split ring means.

2. A starter motor according to claim 1; in which said first and second part-annular ring means occupy different angular extents.

3. A starter motor according to claim 1; in which said first and second part-annular ring means each occupy the same angular extent.

4. A starter motor according to claim 1; in which said split ring means has a circumferential portion extending partially from said groove, said portion including a radially directed circumferential surface and opposite axially directed annular surfaces, and said retaining ring means includes only a first portion positioned on said shaft in abutting relation to one of said opposite annular surfaces of said split ring means and a second portion connected to said first portion and positioned in said snug fitting, abutting and surrounding relation to said circumferential surface of said split ring means for holding said split ring means in said groove.

5. A starter motor according to claim 4; in which said groove has a substantially rectangular cross-sectional configuration and said split ring means has a substantially rectangular cross-sectional configuration.

6. A starter motor according to claim 5; in which said retaining ring means circumferentially surrounds and abuts the entire radially directed circumferential surface of said split ring means.

* * * * *